Jan. 24, 1956 R. F. ALLYNE 2,731,807
METHOD OF AND APPARATUS FOR CONTROLLING THE
TEMPERATURE OF TRAILER CARGO AND THE LIKE
Original Filed Jan. 18, 1950 3 Sheets-Sheet 2
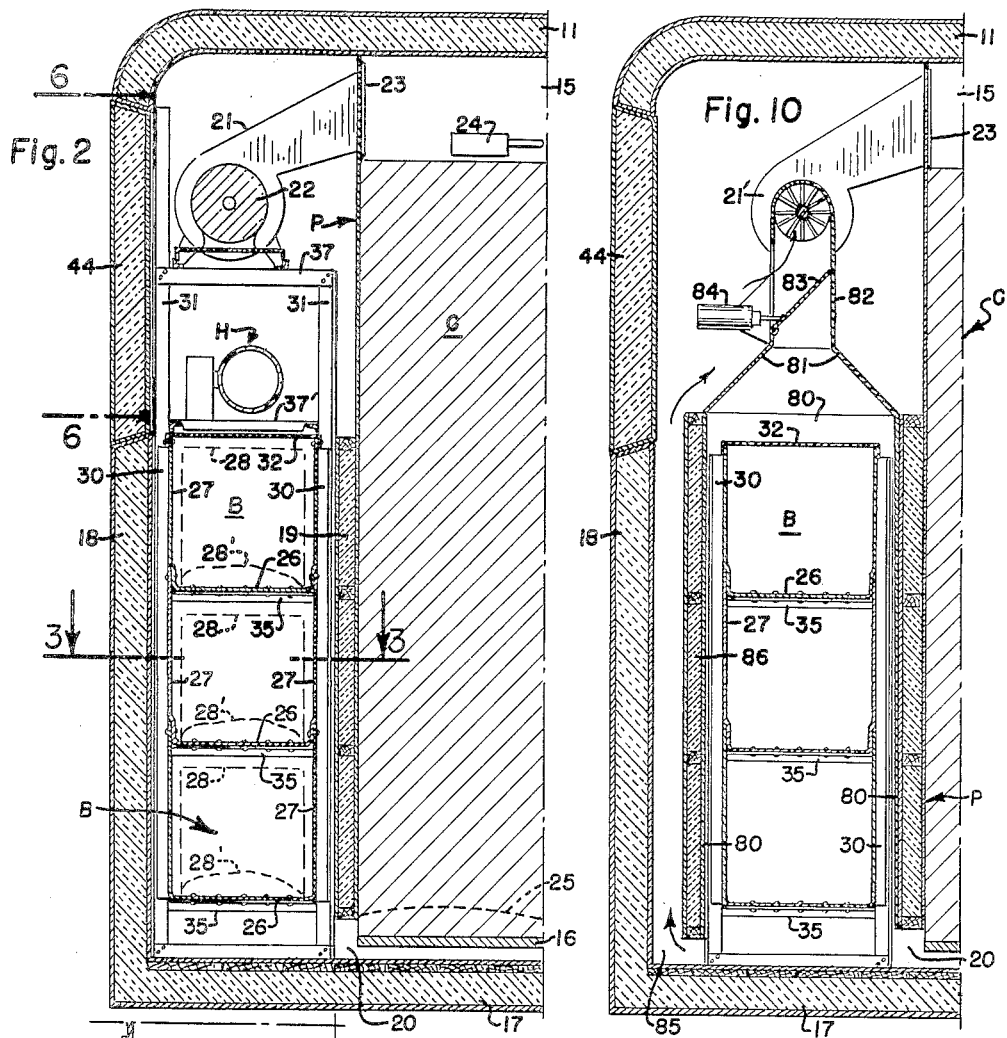
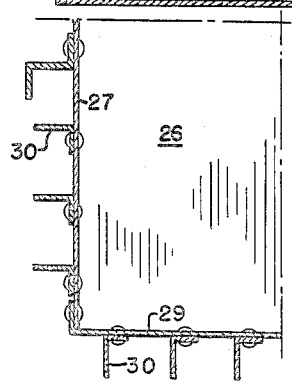
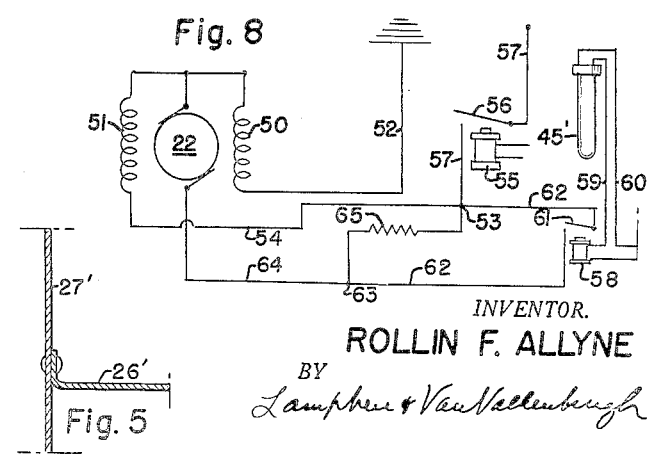
INVENTOR.
ROLLIN F. ALLYNE
BY
Lamphere & VanValkenburgh
ATTORNEYS Jan. 24, 1956
R. F. ALLYNE
2,731,807
METHOD OF AND APPARATUS FOR CONTROLLING THE
TEMPERATURE OF TRAILER CARGO AND THE LIKE
Original Filed Jan. 18, 1950
3 Sheets-Sheet 3
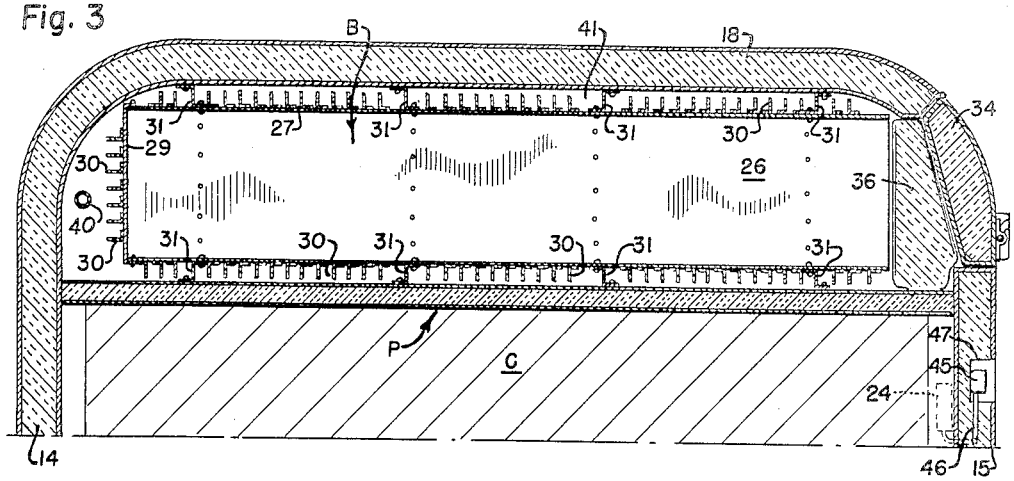
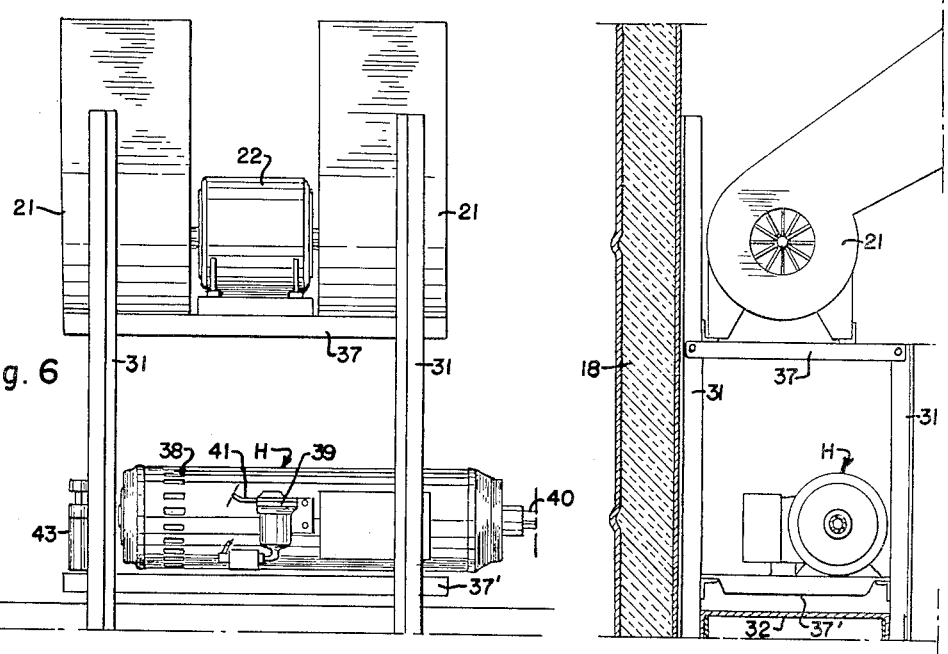
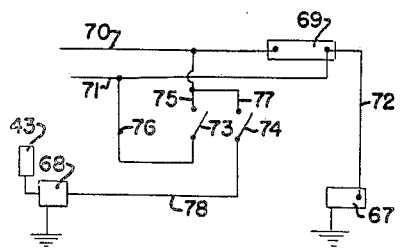
INVENTOR.
ROLLIN F. ALLYNE
BY
Lamphere & Van Valkenburgh
ATTORNEYS United States Patent Office 2,731,807
Patented Jan. 24, 1956

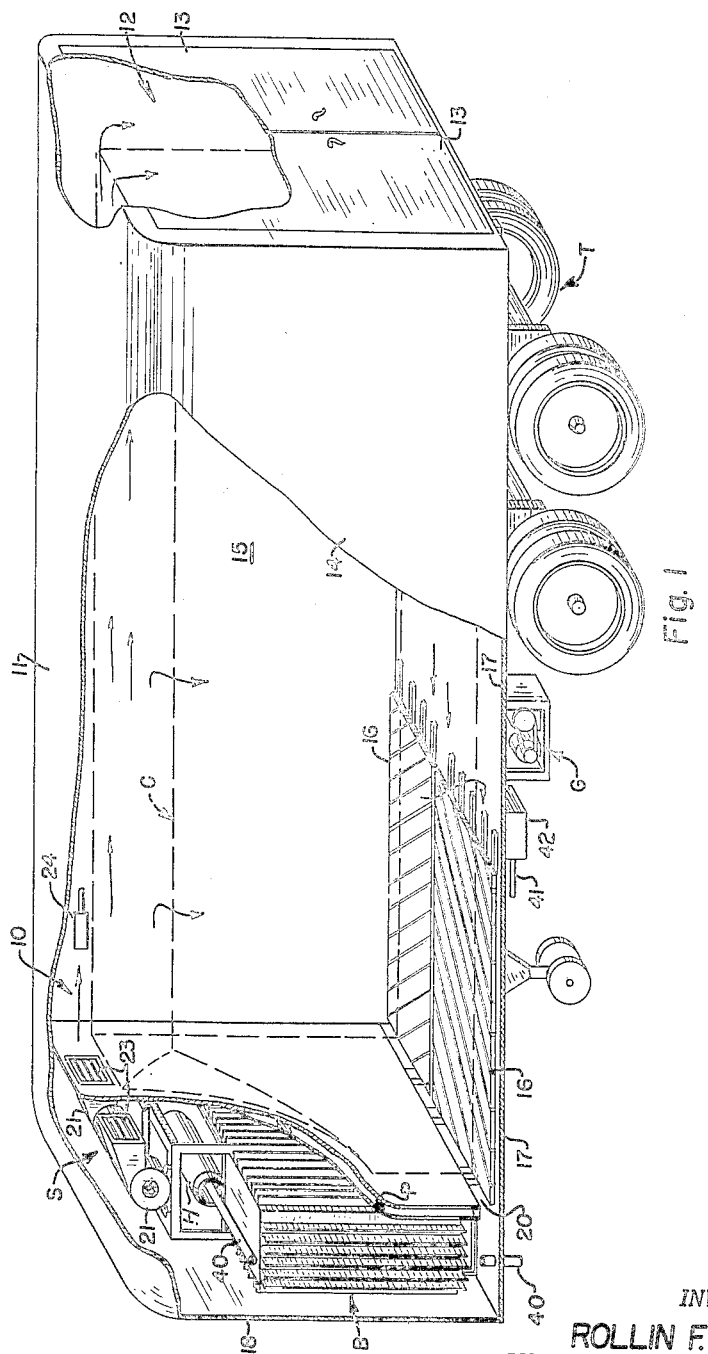

2,731,807

METHOD OF AND APPARATUS FOR CONTROLLING THE TEMPERATURE OF TRAILER CARGO AND THE LIKE

Rollin F. Allyne, Newport News, Va.

Original application January 18, 1950, Serial No. 139,279, now Patent No. 2,589,031, dated March 11, 1952. Divided and this application January 10, 1952, Serial No. 265,763

9 Claims. (Cl. 62—6)

This invention relates to a method of and apparatus for controlling the temperature of trailer cargo and the like, and also to a refrigeration unit for truck trailers and the like, particularly adapted to contain a solid deliquescent or sublimating refrigerant, such as solid carbon dioxide or Dry Ice. This application is a division of my co-pending application Serial No. 139,279, filed January 18, 1950, now U. S. Patent 2,589,031, granted March 11, 1952.

In the transportation of all perishables requiring protection against heat or cold, particularly in the case of relatively large trailers drawn by a tractor, the time during which the commodity is in the trailer during a cross country run may be several days. Many of these runs are substantially non-stop, and the temperature variations are usually considerable. For instance, in a run between Denver and Los Angeles, the temperature when the trailer is passing over the mountains, both west of Denver and east of Los Angeles, is usually considerably lower than when crossing the arid and/or desert country in between. Furthermore, the difference between the day and night temperatures in arid or desert country is usually large. Thus, during a large portion of the run, refrigeration is necessary for the transportation of meats, vegetables and the like. However, since food is normally moved to population centers, and non-perishables are normally moved away from population centers, it often happens that refrigeration will be necessary for the cargo carried in one direction, but will be unnecessary for the cargo carried on the reverse trip. Again, during winter months the outside temperatures, as over mountain passes, may be sufficiently low so that certain perishable items might tend to freeze and thereby become damaged, so that it is sometimes necessary to supply heat to the cargo.

Mechanical refrigeration equipment has been developed which may be installed in a truck body, trailer or the like, to cool the cargo adequately and maintain the desired temperature. However, the weight of such mechanical equipment is fixed, and oftentimes on a run on which the nature of the cargo is such that refrigeration is unnecessary, such weight materially reduces the pay load which may be carried by the truck or trailer. Also, the initial and maintenance costs of such equipment are relatively high, and its use only during a part of the time adds materially to the actual cost of maintaining the desired temperature of the cargo. Water ice is not a suitable refrigerant for such cargoes, since the melting point of ice is +32° F., and the temperature to which air may be cooled by passing over such ice is generally limited to above 32°. Thus, since some of the cargoes carried are frozen and others must be maintained at a temperature below +32° F., water ice is an unsatisfactory refrigerant.

Solid carbon dioxide, which deliquesces or sublimates, i. e. changes from the solid to the gaseous state, at about −112° F. at one atmosphere pressure, is suitable for cooling air to a temperature below that to which any perishable or frozen cargo must be cooled or maintained. Thus, if a supply of solid carbon dioxide sufficient to last for a predetermined period, can be loaded in a truck or trailer at the start of a trip, the weight will decrease during the trip. Also, the total weight of the refrigeration equipment is much less than mechanical refrigeration equipment when cooling is not needed. However, because of its extremely low temperature, previous attempts to utilize solid carbon dioxide as a refrigerant for maintaining a cargo cool in a truck body or trailer have not been entirely satisfactory, because of lack of adequate control of the cooling effect, localized freezing of portions of the cargo, and for other reasons. Thus, if an attempt is made to transfer heat directly from the cargo to the solid carbon dioxide, that portion of the cargo nearest to the cooling unit tends to be unduly cooled, which is particularly disadvantageous in the case of certain perishable vegetables. If one portion of the cargo is cooled considerably more than necessary, the entire operation is inefficient since the maximum temperature of other portions of the cargo must be reduced to a desired point. Furthermore, if a container of solid carbon dioxide is merely placed in the cargo space, but positioned apart from any cargo, air cooled to an extremely low temperature tends to move downwardly from the cooling unit and settle in the bottom of the cargo space, thereby tending to freeze the lower portion of the cargo and permit the upper portion to remain at an undesirably high temperature. Previous attempts to provide adequate circulation of the cooling air have not been entirely satisfactory.

In addition to the long hauls, or cross country runs, there are short hauls, such as involving delivery trucks and the like, and the problem of adequate cooling, more nearly uniform temperature, and maintenance of cooling capacity are again of importance. Thus, it is important that all parts of a cargo be maintained sufficiently cold, and that heat loss due to the frequent opening and closing of doors be compensated. In addition, since the outside temperature is normally higher in the afternoon than the morning, for instance, it is necessary that adequate cooling capacity be present later in the day as well as earlier.

Among the objects of the present invention are to provide a novel method of controlling the temperature of a trailer cargo or the like; to provide such a method which is particularly useful in cooling cargo by means of a low temperature refrigerant, such as solid carbon dioxide; to provide such a method by which the cargo is cooled indirectly, as by utilizing air as a heat transfer medium; to provide such a method by which undue cooling or freezing of any portion of the cargo is eliminated; to provide such a method by which all portions of the cargo may be maintained at or about the same temperature, within limits of a few degrees; to provide novel apparatus for controlling the temperature of a trailer cargo or the like, and particularly adapted to carry out the above method; to provide such apparatus which is particularly adapted to be installed in a trailer, truck body, or other cargo space to provide temperature control during transportation; to provide such apparatus which may also be utilized in cooling down a cargo which is warm when loaded; to provide such apparatus by which adequate circulation of cooled air is obtained; to provide such apparatus which prevents the freezing or undue cooling of any portion of the cargo; to provide such apparatus which can also be utilized in conjunction with a heater for heating the cargo; to provide such apparatus which includes a novel cooling or refrigeration unit for a solid refrigerant, such as solid carbon dioxide; to provide such a refrigeration unit particularly adapted to cool air passed along the exterior thereof; to provide such a unit which may be made readily accessible for loading of solid carbon dioxide therein; to provide such a unit, the cooling capacity of which remains substantially constant, between the time a full charge of solid carbon dioxide cakes are placed therein and the time at which these cakes have almost disappeared; to provide such apparatus which may be accurately controlled; to provide such apparatus which may be constructed in more than one form; to provide such apparatus which may be made comparatively light in weight, so that the pay load of the truck body or trailer may be a maximum when refrigeration is not required; and to provide such apparatus which will be efficient in operation and relatively cheap to construct, install, and maintain.

Additional objects and the novel features of this invention will become apparent from the following description, taken in connection with the accompanying drawings, in which:

Fig. 1 is a perspective view of a trailer provided with cargo temperature control apparatus constructed in accordance with this invention, and by which the method of this invention may be carried out;

Fig. 2 is a vertical section taken centrally at the forward end of the trailer of Fig. 1, also showing in vertical section a solid refrigerant unit constructed in accordance with this invention;

Fig. 3 is a horizontal section taken along line 3—3 of Figure 2;

Fig. 4 is an enlargement of a portion of Fig. 3, showing more particularly details of construction of the refrigeration unit, at a forward corner thereof;

Fig. 5 is a fragmentary vertical section illustrating a construction of a portion of the refrigeration unit, alternative to that shown in Fig. 2;

Fig. 6 is a front elevation of a blower unit and a heating unit, which are installed above the refrigeration unit, and taken generally from the position of line 6—6 of Fig. 2;

Fig. 7 is an end view of the blower and heating units of Fig. 6, showing also a portion of the front wall of the trailer;

Fig. 8 is a wiring diagram illustrating a cooling control circuit for the motor of the blowers of Fig. 6;

Fig. 9 is a wiring diagram illustrating a control circuit for the heater unit which may be added to or incorporated in the cooling control circuit; and Fig. 10 is a vertical section, similar to Fig. 2, illustrating an embodiment of this invention claimed in said Patent 2,589,031.

As illustrated in Fig. 1, the method of this invention may be carried out by utilization of the apparatus installed in a control space S, at the forward end of a trailer T which carries a load or cargo C. The cargo C is illustrated as a solid body of material, shown in dotted outline in Fig. 1 and in section in Figs. 2, 3 and 10, it being understood that when the cargo is a number of cartons, for instance, which may be packed close together, the cargo C may occupy all of the space indicated, but since the cargo often consists of separate pieces of irregular shape, such as hanging meat or the like, there may be air passages to a greater or less extent between the various parts of the cargo. However, a solid cargo, that is, a cargo which is packed so that there are substantially no air passages between the pieces or parts, is generally the most difficult to maintain cool, or to heat, so that it will be substantially uniform at all points.

The cargo C is preferably placed in the trailer T to provide a space 10 above the cargo, between the cargo and the roof 11 of the trailer T and extending from front to rear, a space 12 between the rear end of the cargo C and the rear doors 13 of the trailer, as well as spaces between the sides of the cargo and the respective side walls 14 and 15 of the trailer. In addition, the cargo is preferably placed on racks 16, which may consist of diagonally extending panels or plates, preferably spaced apart and mounted on longitudinally extending bars, to provide air passages between the bottom of the cargo and the floor 17 of the trailer. The roof 11, rear doors 13, sides 14 and 15, floor 17 and the front wall 18 of the trailer are preferably double walled and insulated in a conventional manner, as shown.

The temperature control space S may be formed by the partition P, spaced from the front wall 18 of the trailer a sufficient distance to accommodate a refrigerant unit or bunker B, adapted to contain a solid refrigerant such as Dry Ice, i. e. solid carbon dioxide. Partition P, as in Fig. 2, is preferably provided with insulation 19 up to at least the top of the bunker B, so as to prevent any cargo on the opposite side of the partition P from being unduly cooled. The partition P is preferably solid and air tight, except that the lower end is preferably spaced from the floor 17 of the trailer, to provide a passage 20 for air to be drawn from the cargo space, upwardly past the bunker B, such air thereby being cooled, and then discharged into the space above the cargo by a pair of blowers 21 driven by a motor 22, mounted above the bunker. As indicated by the arrows of Fig. 1, the cooled air may be discharged through vents 23 in partition P, so as to be propelled rearwardly through space 10 along the top of the cargo, some of the air passing downwardly along the sides of the cargo, in the spaces next to the sides 14 and 15 of the trailer, and the remainder of the air passing over the rear of the cargo, down through the space 12 adjacent rear doors 13. The air then moves through the passages beneath the racks 16, to the passage 20 between the partition P and the floor 18, for recirculation. Such air flow, of course, may take place only during the cooling periods, i. e. when the temperature of the cargo space reaches the high setting of a thermostat, such as including a bulb 24 in the position of Fig. 2, and until the low setting is reached. Since adequate contact of the air with the cargo can be obtained by such circulation, the temperature at thermostat bulb 24 will correspond to the temperature of the cargo itself, it being understood that the cargo temperature may vary slightly, such as from 2 to 3° over various parts thereof, and also that the thermostat bulb 24 may be slightly above or below the average temperature of the cargo, depending upon whether the cargo is being cooled down or is heating up. However, cargoes generally do not need to be maintained within a fraction of a degree, since a range of temperature variation, such as 5° or 6° F., is usually permissible.

When the cargo has been cooled sufficiently so that the thermostat responds to its lower limit, the above circulation of cold air is terminated. However, in accordance with this invention, the blowers 21 are not completely shut off, but are operated at a reduced speed, that is, a speed sufficient to produce very little, if any, circulation of air to the cargo, but at the same time sufficient to cause the air to "hang," as it were, in the control space S. This prevents the cold air from settling downwardly from the bunker B, to the floor of the trailer, and then passing rearwardly through the passage 20 at the bottom of partition P, to collect beneath and around the portion of the cargo adjacent the lower end of partition P. In the absence of movement past the bunker B, such air may be cooled to a very low temperature, and if allowed to collect about the lower front end of the cargo C, may tend to unduly cool or freeze a portion of the cargo. If the cargo is packed solid, the portion frozen will generally lie along the bottom, but if there are some air spaces between the various pieces of the cargo, this extremely cold air will tend to collect adjacent the partition P. Such cold air tends to freeze or cool unduly a portion of the cargo which may extend over an area indicated generally by the dotted line 25 of Fig. 2. However, with the blowers 21 operating at reduced speed, such reverse flow of cold air is prevented, and the possibility of unduly cooling or freezing a portion of the cargo is eliminated.

The refrigerant unit or bunker B, constructed in accordance with this invention, is provided with a plurality of shelves 26 which, as in Fig. 2, provide conduction through metal to the side walls 27 of the bunker. The Dry Ice cakes, such as indicated by the dotted lines 28 of Fig. 2, are placed on the shelves 26, and due to the conduction through metal of heat from the side walls 27 to the shelves 26, very little heat, such as only about 5%, will be transferred by convection directly between the cakes 28 and the side walls 27. Due to the greater rate of heat conduction through metal, the bottoms of the cakes will receive nearly all of the heat, which will cause sublimation and reduction in volume of the solid carbon dioxide, so that as the cakes are reduced to volume, the area of contact, between each cake and the shelf 26 on which it rests, will be maintained substantially constant. Thus, the cakes will be reduced in height until only a small portion is left, such as represented by the dotted lines 28' of Fig. 2, but the contact area between the cakes and the shelves will remain substantially the same. The slight melting down at the sides and along the tops of the cakes, when the cakes have reached the volume represented by dotted lines 28', represents the small portion of heat transferred by convection or radiation. Due to the maintenance of the area in contact, the cooling effect or refrigerating capacity of the bunker B will remain substantially the same throughout the effective life of the cakes. This is an important advantage, since a substantially uniform refrigerating effect permits the blowers to be run at a constant speed during cooling, with assurance that toward the end of a long run, for instance, the cargo C will be just as effectively cooled as at the start of the run, when the Dry Ice cakes are new. Thus, the cargo need not suffer because of reduced refrigerating capacity. It is to be noted that a large reduction in refrigerating capacity, when the volume and consequently the surface area of the cakes has been reduced considerably, has constituted a serious disadvantage of previous attempts to cool trailer cargoes and the like by means of solid carbon dioxide ice, and has previously provided an advantage for mechanical refrigerating units. Thus, by use of the refrigerant unit or Dry Ice bunker of this invention, this previous disadvantage has been overcome, and advantage may be taken of lower initial and operating costs and the saving in pay load weight, when refrigeration is unnecessary, provided by the use of Dry Ice.

When solid carbon dioxide sublimates, carbon dioxide is of course produced. The resultant gas may be vented to the outside or to the interior of the trailer, to add somewhat to the refrigerating effect, although the volume of the gas produced is relatively small in comparison with the amount of air circulated. Thus, a suitable pipe, provided with a three-way valve operated from the exterior of the trailer (neither shown) may be connected to the bunker B, so that the resultant carbon dioxide may be passed to the interior of the trailer or to the outside, as desired. The direction of venting of the gas will normally be determined by the character of the cargo. Thus, there are some cargoes, such as fresh meats, strawberries, cherries and the like, for which carbon dioxide gas is beneficial, i. e. $CO_2$ tends to have an inhibiting effect on the action of enzymes and bacteria in such cargoes. However, in the case of certain fruits and leafy vegetables, $CO_2$ apparently tends to have a detrimental effect, so that the bunker should be vented to the outside for such cargoes.

In order to provide adequate conduction of heat through metal between the shelves 26 and the side walls 27, each shelf 26 may be made integral with a section of the side wall. As in Fig. 2, the lower end of each section may be reduced in width, at the shelf, so that the sections will be interfitting. Or, as in Fig. 5, each side wall 27' may be made of a single piece or sheet of metal, and the shelves 26' riveted thereto on the inside, with relatively wide flanges on the shelves to provide sufficient metal to metal contact between the shelf 26' and the side wall 27'. To increase the transfer of heat from the air passing therearound, the side walls 27 and also the rear end 29 of the bunker B, as in Figs. 2–4, may be provided with outwardly extending fins 30, each having a short leg riveted to the side wall or end of the bunker and a longer leg extending outwardly therefrom. Also, at spaced positions about the bunker, posts 31 or the like, such as Z-section posts as in Figs. 3 and 4, may be riveted to the bunker wall to support the bunker B above the trailer floor 17, to permit air to pass under the same. The posts 31 along the forward wall may be conveniently secured, as by riveting, to the front wall 18 of the trailer, while the posts 31 along the rear wall may conveniently support the partition P. The central posts 31 may also extend above the top 32 of the bunker, to provide support for the blowers 21 and a heater H, while the fins 30 are preferably provided only on the sides and the end of the bunker, since a considerably greater amount of heat is transferred to the air from the fins and by omitting fins on the bottom and top of the bunker, all the cakes will tend to sublimate in synchronization. Of course, if the lower cakes sublimate too rapidly, then the fin arrangement may be altered, or other changes made. It is to be emphasized, of course, that the heat transfer is, as far as possible, substantially exclusively by conduction through metal from the side walls to the shelves on which the cakes rest.

As in Fig. 3, bunker B may be open at one end for loading purposes, and the trailer T is conveniently provided with an insulated door 34 which may be opened to place Dry Ice cakes in the bunker, to remove the residue of cakes, or for cleaning and inspection purposes. The loading edge of each shelf 26 may also be reinforced by an angle 35, as in Fig. 2, or other suitable means to withstand the Dry Ice cakes being bounced or slammed on the loading edges. In an available commercial size, Dry Ice cakes are about ten inches by ten inches square and from about eleven inches to thirteen inches in height, weighing about fifty to fifty-seven pounds apiece. Each shelf 26 may be designed to take any desired number of cakes, seven cakes to each shelf being the capacity of a bunker used in cooling large trailers on a long run. As will be evident, the three shelves will take 21 cakes, and if refrigeration is not needed, the weight available for pay load is at least 21 x 50 or 1050 pounds—over one-half ton. In addition, the total weight of a refrigeration unit constructed in accordance with this invention is less than a mechanical unit of similar capacity. For example, the weight of the 21 cake unit mentioned above is only 500 lbs., which is between ½ and ⅓ of the weight of mechanical units of approximately equivalent capacity.

The door 34 need extend only to the top of the bunker and when closed, the space between the open end of the bunker and the door is preferably occupied by an insulating bag 36 which covers the open end of the bunker, as in Fig. 3. Of course, the loading end of the bunker may be closed by hinged doors, or other suitable means to render the bunker more nearly gas tight, if desired. However, the insulating bag 36 may be pressed in about the edges of the bunker openings so as to provide an effective seal, when the $CO_2$ is to be vented to the outside. When the $CO_2$ is to pass to the interior of the trailer, the insulating bag may be left slightly ajar at one edge to provide egress for the gas produced by sublimation. The bunker B may, of course, be made so as to be loaded at the center, in which case the loading door will be located in the front wall 18 of the trailer, and an insulating bag may or may not be used, as desired. Of course, one advantage of end loading is that the side walls over the center space can conduct heat through metal to the shelves, whereas if center loading is employed, either an open space in the front of the bunker or doors for access to the shelves will tend to reduce the cooling capacity of that area of the side walls.

The blowers 21 and motor 22, as in Figs. 3, 6 and 7, may be mounted on a series of bars or angles 37 or the like, extending between the central posts 31, which in turn extend above the top 32 of the bunker B, as indicated previously. The blowers 21 are conveniently two in number, each of which has a pair of opposed axial intakes and a circumferential discharge. A pair of blowers not only provide a better distribution of the discharged air, but also tend to provide better balance for the motor 22, since a blower may be mounted on each end of the motor shaft. However, it will be understood that only one, or more than two, or other or different types of blowers or air circulators may be utilized. The heater H may also be mounted on bars or angles 37', similarly extending across and/or between the central posts 31, above the top of the bunker but below blowers 21, although the heater may be placed in other positions.

The heater H may be of a conventional type and include, as in Fig. 6, air intake ports 38 leading to a motor driven fan (not shown), which causes the air to pass through a heating section in which a fuel, such as gasoline or fuel oil, is burned, the fuel being supplied to the heating section through a float controlled inlet 39 and the products of combustion exhausted through a pipe 40, shown also in Fig. 1. Pipe 40 extends to the outside, such as across the top of the bunker B, then down along the closed end and through the floor of the trailer. Also, fuel may be supplied through a tube 41 which extends to inlet 39 from a convenient source of supply, such as the fuel tank 42 of the generating unit G, as in Fig. 1, a suitable pump or the like (not shown) being provided at tank 42. A control thermostat 43, for the heater, may be mounted adjacent the intake end thereof, and operated to turn the heater on and off, in accordance with the air temperature within the trailer, and more particularly in the control space S. During heating, the blowers 21 preferably operate continuously to minimize stratification and produce an even temperature distribution for the full length of the cargo, although other control systems may be utilized.

Since the heater and blowers may at times require inspection or maintenance, particularly since the same include moving parts, a relatively large inspection door 44 is preferably provided in the front wall 18 of the trailer, as in Fig. 2, so that access to the blowers and heating unit may be obtained without the necessity of disturbing any part of partition P, or any part of the cargo. Access to the heater and blower unit through the Dry Ice loading door 34 is not preferred, though possible, since the space around the blowers and heater unit is rather limited.

As indicated previously, the thermostat bulb 24, for use in controlling the cooling cycles, is preferably positioned near the top of the trailer, at the front of the cargo space, since normally the warmest spot in the cargo space will be at this point, due to the lower specific gravity of warm air and the higher specific gravity is cold air, as the latter tends to settle to the bottom and to the rear of the trailer. When the outside temperature is lower than that desired for the cargo, and heating is required, the coldest spot will generally be at the floor, at the rear end of the trailer, but when the blowers maintain air circulation at all times, the temperature will be more nearly uniform throughout the trailer, so that the location of the heater thermostat 43 adjacent the heating unit H provides a sufficiently accurate indication, for practical purposes, of the temperature of the cargo.

When the thermostat bulb 24 for controlling cooling is located near the roof, on the inside, an expansion line, such as tube 45, may lead to a control unit 46, which may include a bellows and control switch, the same being conveniently disposed in a "post office box" 47 or similar accessible position on the outside of the trailer, as in Fig. 3. The "post office box" may be provided with a door, to provide accessibility for setting the temperature controls, at predetermined limits, and also for changing from cooling to heating and vice versa. The thermostat bulb 24 is connected by tube 46 with control unit 45 and may be the conventional type, wherein the coldest point in the bulb or tube influences the control unit. It may sometimes happen that the upper portion of the cargo, as received by the shipper, will be warmer than the lower portion of the cargo and require cooling. To preclude the possibility of the thermostat being artificially satisfied because of unprotected proximity of a lower or colder portion of the cargo to tube 46, the tube should pass upwardly through the insulation of side wall 15 of the trailer until relatively close to bulb 24.

The blower motor 22 and the heater H are preferably operated electrically, and electricity may be supplied thereto from the tractor for the trailer, but it is preferred to install a governor-controlled, gasoline driven, generating unit G beneath the trailer, as in the position shown in Fig. 1. This generating unit G permits the refrigerant unit to be operated while the trailer is not connected to a tractor, such as at a loading dock when a cargo is being loaded thereinto, and thus is particularly valuable when the cargo being loaded is warm but should be cooled down as soon as possible. In addition, the generating unit relieves the tractor generator and battery of a continuous drain, since electricity for the blowers and/or heating unit may comprise a greater load than for which the battery or generator of the tractor unit may be designed, except for temporary operation. Thus, a standby emergency line is preferably provided so that electricity may be supplied temporarily from the tractor in case the generating unit stops and cannot be started within a suitable time.

The control of the two speed or variable speed motor 22 may be achieved through any suitable circuit, an illustrative example being shown diagrammatically in Fig. 8. The motor 22, represented by its rotor and brushes, may be a direct current, compound wound motor having a series field 50 and a shunt field 51, the former being connected to ground, as by a wire 52, and the latter to a junction 53, as by a wire 54. A starting relay coil 55 may control a switch 56 in a line wire 57 leading to junction 53, while a thermostat control unit 45' (represented as including also a temperature bulb) may be connected in series with a relay coil 58, as by wires 59 and 60, which controls a switch 61. Switch 61 is interposed in a line 62, leading from junction 53 to a secondary junction 63, connected by a wire 64 with the armature of motor 22. When the thermostat control 45' is actuated by the temperature reaching the "high" setting, cooling thereby being required, the thermostat contacts (not shown, being conventional) will cause current to be supplied to relay coil 58, which when energized will cause switch 61 to be closed. With switch 61 closed, full line current will pass through the armature of motor 22, so that the motor will turn at its higher speed. However, when the temperature drops so that the lower limit of thermostat control 45' is reached, the contacts thereof will open, causing relay coil 58 to be de-energized and switch 61 to open. Current to the armature of motor 22 then will pass only through a resistance 65, connected between junctions 53 and 63, thus reducing the amount of current flowing to the motor armature and reducing the speed thereof. The value of resistance 65, which may be made variable resistance if desired, is preferably proportioned to the amount of current necessary to cause the motor to turn over relatively slowly and thereby cause the blowers to operate at a sufficiently low speed that little or no circulation of air through the cargo space of the trailer is produced, but at the same time keep the air suspended or hanging in the control space S, shown in Fig. 2. Thus, there will be no tendency for extremely cold air to drift into the cargo space and unduly freeze or cool portions of the cargo. It will be understood, of course, that other control circuits may be utilized, for controlling the operation of the two speed or variable speed motor.

The circuit for controlling the heater may be provided in any suitable manner, an illustrative example being shown in the wiring diagram of Fig. 9, in which certain parts may be incorporated in, or may be added to, the control circuit for cooling, such as that shown in Fig. 8. In Fig. 9, block 67 represents the starting relay for both blower motor and heater, block 68 represents the heater, and block 69 represents the normal cooling thermostat control device. Wires 70 and 71 represent, respectively, the full speed and reduced speed leads to the main blower motor 22, while line wire 72 connects relay 67 with thermostat 69. When closed, due to cooling being called for, thermostat control 69 will normally connect line wire 72 with the blower motor through full speed wire 70, but when open will connect only reduced speed wire 71, which includes a resistance or the like, with the blower motor. A double pole switch having blades 73 and 74 is therefore provided, so that when closed, blade 73 will connect a wire 75, leading from wire 70, with a wire 76, leading to wire 71, so that the blower motor will run at full speed when current is supplied to the heater, irrespective of the position of thermostat 69. In addition, switch blade 74, when closed connects a branch wire 77 of wire 75 with a wire 78 leading to heater 68. The operating circuit for the heater is, of course, in series with the contacts of the heater thermostat 43, so that the operation of the heater will be intermittent, depending upon the temperature of the air within the control space. It will be understood, of course, that other circuits, such as an independent circuit for the heater and a short circuiting switch for the full speed blower motor connection, may be utilized.

There are, of course, variations which may be made in the method and apparatus of the present invention, and particularly in the manner in which a back flow of cold air to the cargo space may be prevented during the cooling interruption periods. Thus, apparatus claimed in and particularly adapted to carry out the method claimed in said Patent No. 2,589,031 is illustrated in Fig. 10, in which the bunker B, the partition P, and vents 23 are similar to those of Figs. 1–5. However, the blowers 21' of Fig. 10 are adapted to be run at full speed during all the time and may have intakes on only the inner sides. The bunker B is mounted within a bell or open bottom enclosure 80 which provides passages at the sides and at one end, to permit air to pass between the fins 30. Bell 80 is also provided with an upwardly converging top 81 which leads to a duct 82, connected with the intake of the blowers 21', or a separate duct for each blower may be provided, if desired. One side of duct 82 is provided with a gate 83, preferably hinged at the bottom and adapted to be opened or closed by suitable means, such as a hydraulic cylinder 84. With gate 83 in the position shown, i. e., closing duct 82 against the flow of air from the bunker B, but permitting air to flow into the duct and to the blowers from the control space S, above bell 80, air will be discharged into the cargo space by the blowers and will be withdrawn from the bottom of the cargo space, but will pass underneath the bunker B and through a passage 85 formed between the front wall 18 of the trailer and the front wall of bell 80, which is preferably provided with insulation 86. Thus, between cooling periods, the air will be by-passed around the bunker B. Also, any cold air settling downwardly from the bunker B will be mixed with the air passing therebeneath and will not settle beneath the cargo at the front lower end of the cargo space. However, the amount of cold air which will be mixed with the air by-passed around the bunker will be relatively small, so that no undue cooling effect will tend to be produced. The operation of hydraulic cylinder 84 may be by a suitable thermostat control device, such as that previously described. Of course, provision must be made for supplying oil or other suitable liquid to the cylinder 84, so that an electromagnet may, if desired, be utilized instead of a hydraulically operated device. Preferably, the gate 83 is mounted so as to be in either one position or the other, i. e. opened or closed, although provision can be made for controlling the amount of cooling by moving the gate to different intermediate positions.

It will be understood, of course, that other changes and variations may be made, as for instance mounting the heater outside the trailer and connecting the same to two different points of the control space, so that air from the control space will pass through the heater from one point and the heated air will enter the control space at another point. Normally, the fan incorporated in the heater has insufficient power to cause the desired circulation of air through the cargo space, so that the blowers 21, which normally have considerably greater capacity than the heater fan, are preferably utilized for such circulation. The bunker shelves may be loaded from the center or from either end, although end loading is normally more convenient. Also, a single blower may be used, although two or more blowers tend to distribute the air more nearly equally across the space at the top of the cargo. It will be understood, however, that the blowers may be located at other positions, as long as an adequate circulation of air about the cargo and about the cooling unit is maintained.

From the foregoing, it will be evident that the method and apparatus of this invention fulfill to a marked degree the requirements and objects hereinbefore set forth. By passing the air, either for cooling or heating, along the top of the cargo, through spaces along both sides and at the opposite end of the cargo, as well as beneath the cargo, the temperature of all points of the cargo can be maintained more nearly uniform. A heating and/or cooling unit may be installed in any desired position, although a position at the front of a truck or trailer, for instance, tends to interfere least with access to the cargo. The cooling unit is preferably disposed in a space which is separated from the cargo by a properly insulated partition, and an important feature of this invention is the prevention of a backflow of cold air to the cargo during the off periods of the cooling cycle. This is preferably carried out by operating the blowers at a reduced speed, sufficient merely to cause the air to hang, as it were, about the cooling unit.

By placing the heater in the control space, additional cargo space can be provided, but the heater may be located in any other desired position. However, during heating, it is of considerable advantage to operate the blowers normally used to circulate cooled air about the cargo, since an effective transfer of heat to the air from the cargo, or vice versa, is essential.

When the temperature of various points of the cargo can be maintained more nearly uniform, and undue cooling or freezing of certain parts of the cargo prevented, then a solid refrigerant which sublimates, such as solid carbon dioxide, with its attendant advantages, can be utilized. For effective refrigeration, it is highly desirable that the refrigerating or cooling capacity be maintained at a relatively high level during the entire period of use, since a sharp reduction in such capacity, toward the end of a particular period, may result in a loss or spoilage of cargo. A solid refrigerant heat transfer unit or bunker, constructed in accordance with this invention, fulfills these requirements. When the Dry Ice cakes are placed on shelves or the like, conduction of heat is through metal from the side walls, which are preferably provided with fins to increase the amount of heat transferred from air passing thereover, the rate at which the carbon dioxide cakes sublimate may be made more nearly uniform for all shelves in a multi-shelf unit. Thus, a relatively uniform refrigerating effect is the result of a cooling surface whose area and temperature remain relatively constant.

The control point for the cooling thermostat is preferably disposed near the top, adjacent the forward end of the cargo space, and it is more convenient to place the controls in a more accessible position, such as in a "post office box" or the like on the outside of the trailer. However, the line from the bulb to the control bellows should be insulated, such as by extending through the insulation of the sidewalls of the trailer or the like, so that an initially colder portion of the cargo, if at the lower front end of the cargo space, will not produce erratic control action.

Although certain specific embodiments of this invention have been illustrated and described, it will be understood that other embodiments may exist and various changes made therein, all without departing from the spirit and scope of this invention.

What is claimed is:

1. Apparatus for controlling the temperature of trailer cargo and the like, comprising a wall defining a space at the forward end of said trailer or the like, said wall being spaced from the bottom of said trailer by an opening and having at least one air discharge opening adjacent the top; a Dry Ice bunker for cooling air to a temperature below that of the desired temperature of said cargo, said wall being insulated between said bunker and said cargo; continuously operating air impulse means for imparting an impulse to said air at least at one point above said bunker normally to effect a circulation of air by drawing air from the lower portion of said cargo space through said lower opening and upwardly along said bunker and then discharging said air into said trailer through said top discharge opening so that said air passes around said cargo to cool the same and then returns to said lower opening for recirculation, said air impulse means also being operable at a lower rate of air impulse which produces not more than very little circulation of air through said cargo space but is sufficient to prevent a back flow of cold air from said bunker to the lower portion of said cargo; and means for controlling said air impulse means in accordance with the temperature in said cargo space so that said air impulse means operates at said higher rate when cooling is required and at said lower rate when cooling is not required.

2. Apparatus for controlling the temperature of trailer cargo and the like, comprising a wall defining a space at the forward end of said trailer or the like, said wall being spaced from the bottom of said trailer by an opening and having at least one air discharge opening adjacent the top; a Dry Ice bunker for cooling air to a temperature below that of the desired temperature of said cargo, said wall being insulated between said bunker and said cargo; a blower disposed above said bunker and having an air intake within said forward space and a discharge conduit connected with the discharge opening in said wall; continuously operating drive means for said blower having at least two speeds, including a higher speed for drawing air upwardly along said cooling unit and discharging said air into said trailer above said cargo, so that said air passes around said cargo to cool the same and then returns to the opening beneath said wall for recirculation, and a lower speed which tends merely to cause air to hang in said cooling space without appreciable discharge over and cooling of said cargo, so that the tendency for cold air to settle downwardly from said cooling unit and pass through said opening to cool unduly portions of said cargo is prevented; and means controlling said drive means in accordance with the temperature in said cargo space, so that said drive means operates at said higher speed when cooling of said cargo is required and at said lower speed when cooling is not required.

3. Apparatus for controlling the temperature of trailer cargo and the like, comprising a wall defining a space at the forward end of said trailer or the like, said wall being spaced from the bottom of said trailer and having at least one air discharge opening adjacent the top; a refrigeration unit for cooling air to a temperature below that of the desired temperature of said cargo, said wall being insulated between said unit and said cargo, said unit being a metal compartmented structure having vertical side walls and a plurality of generally horizontal shelves therein, said shelves having a metal to metal heat conductivity relationship with said side walls, so that a block of solid deliquescent refrigerant placed on a shelf will absorb heat from said side walls substantially exclusively by conduction and as said block deliquesces and becomes smaller, the bottom area of said block in contact with said shelf will be maintained substantially constant during a majority of the sublimation time of said block; a blower disposed above said cooling unit and having an air intake within said forward space and discharge conduit connected with the discharge opening in said wall; and drive means for said blower having at least two speeds, including a higher speed for drawing air upwardly along said cooling unit and discharging said air into said trailer above said cargo, and a lower speed which tends merely to cause air to hang in said cooling space without appreciable discharge to said cargo.

4. Apparatus for controlling the temperature of trailer cargo and the like, comprising a wall defining a space at the forward end of said trailer or the like, said wall being spaced from the bottom of said trailer and having at least one air discharge opening adjacent the top; a refrigeration unit for cooling air to a temperature below that of the desired temperature of said cargo, said wall being insulated between said unit and said cargo, said unit being a metal compartmented structure open at one end and having vertical side walls and a plurality of generally horizontal shelves therein, said shelves having a metal to metal heat conductivity relationship with said side walls, so that a block of solid deliquescent refrigerant placed on a shelf will absorb heat from said side walls substantially exclusively by conduction and as said block deliquesces and becomes smaller, the bottom area of said block in contact with said shelf will be maintained substantially constant during a majority of the sublimation time of said block; a door in said trailer providing access to the open end of said cooling unit; an insulating bag for filling the space between said door and said end of said unit; a blower disposed above said cooling unit and having an air intake within said forward space and discharge conduit connected with the discharge opening in said wall; and drive means for said blower having at least two speeds, including a higher speed for drawing air upwardly along said cooling unit and discharging said air into said trailer above said cargo, and a lower speed which tends merely to cause air to hang in said cooling space without appreciable discharge to said cargo.

5. In temperature control apparatus, a unit for cooling air and the like to a relatively low temperature by means of a solid deliquescent refrigerant, which comprises means defining an enclosure having generally vertical side walls; an enclosed, compartmented metal structure disposed within said enclosure means and having a top, a bottom, side walls and end walls, said side walls being vertical and at least said side walls and said bottom being in spaced relation to the side walls and bottom of said enclosure, said structure being provided with an access door for placing cakes of a solid deliquescent refrigerant therein and said side walls having a substantially greater transverse dimension than said end walls, said structure including a plurality of generally horizontal shelves therein with said bottom forming one of said shelves, each of said shelves having a metal to metal heat conductivity relationship with said side walls so that a block of solid deliquescent refrigerant placed on a shelf will absorb heat from said side walls substantially exclusively by conduction and as each said block deliquesces and becomes smaller, the bottom area of said block in contact with said shelf will be maintained substantially constant during a majority of the sublimation time of said block; and means for drawing air upwardly through the spaces between the side walls of said structure and the side walls of said enclosure means.

6. In temperature control apparatus, a unit for cooling air and the like to a relatively low temperature by means of a solid deliquescent refrigerant, as defined in claim 5, wherein each said shelf is integral with a section of the side wall thereabove.

7. In temperature control apparatus, a unit for cooling air and the like to a relatively low temperature by means of a solid deliquescent refrigerant, as defined in claim 5, wherein said shelves above said bottom are attached to said side walls in intimate metal to metal contact.

8. In temperature control apparatus, a unit for cooling air and the like to a relatively low temperature by means of a solid deliquescent refrigerant, which comprises means defining an enclosure having generally vertical side walls; an enclosed, compartmented metal structure disposed within said enclosure means and having a top, a bottom, side walls and end walls, said side walls being vertical and at least said side walls and said bottom being in spaced relation to the side walls and bottom of said enclosure, said structure being provided with an access door for placing cakes of a solid deliquescent refrigerant therein and said side walls having a substantially greater transverse dimension than said end walls, said structure including a plurality of generally horizontal shelves therein with said bottom forming one of said shelves, each of said shelves having a metal to metal heat conductivity relationship with said side walls, so that a block of solid deliquescent refrigerant placed on a shelf will absorb heat from said side walls substantially exclusively by conduction and as said block deliquesces and becomes smaller, the bottom area of said block in contact with said shelf will be maintained substantially constant during a majority of the sublimation time of said block, said structure including a plurality of vertically disposed fins attached to and extending outwardly from at least said walls and no fins extending from the bottom of said structure; and means for drawing air upwardly through the spaces between the side walls of said structure and the side walls of said enclosure means.

9. A method of controlling the temperature of trailer cargoes and the like, to be cooled by a low temperature refrigerant having a temperature sufficiently lower than the lowest temperature to which the cargo is to be cooled that a portion of the cargo may be frozen by uncontrolled cooling and wherein said refrigerant is disposed in heat transfer relationship to an air cooling space disposed at an elevation above the lower portion of said cargo space and through which air may be passed, said method comprising imparting an impulse to said air at least at one point above said air cooling space, normally to effect a circulation of air by drawing air from the lower portion of the cargo space and upwardly through said air cooling space, then passing said cooled air to said cargo space to cool said cargo and to the lower portion of said cargo space, and thence back to said cooling space; controlling said impulse to said air so as to effect a higher rate of air circulation while at least one control point responsive to the temperature in said cargo space is above a first predetermined temperature; and reducing the impulse to said air when said control point is below a second predetermined temperature, said second predetermined temperature being lower than said first predetermined temperature and such reduction in impulse being effected to a value which produces not more than very little circulation of air through said cargo space but which is sufficient to prevent a back flow of cold air from said air cooling space to the lower portion of said cargo, some impulse to said air being effected at all times during cooling operations.

References Cited in the file of this patent
UNITED STATES PATENTS

| | | |
|---|---|---|
| 436,545 | Riordan | Sept. 16, 1890 |
| 1,093,075 | Porges | Apr. 14, 1914 |
| 1,859,613 | Bailey | May 24, 1932 |
| 1,949,735 | Bulkeley | Mar. 6, 1934 |
| 1,989,609 | Rice | Jan. 29, 1935 |
| 2,095,780 | Willat | Oct. 12, 1937 |
| 2,120,299 | Stramaglia | June 14, 1938 |
| 2,124,981 | Krackowizer | July 26, 1938 |
| 2,182,449 | Parks et al. | Dec. 5, 1939 |
| 2,193,185 | Winther et al. | Mar. 12, 1940 |
| 2,195,924 | Hoesel | Apr. 2, 1940 |
| 2,226,755 | Ecoff | Dec. 31, 1940 |
| 2,398,273 | Albers et al. | Apr. 9, 1946 |
| 2,530,598 | Christman | Nov. 21, 1950 |
| 2,553,262 | Lehane et al. | May 15, 1951 |
| 2,589,031 | Allyne | Mar. 11, 1952 |